United States Patent [19]

Meiser et al.

[11] 4,220,430

[45] Sep. 2, 1980

[54] POSITIONING DEVICE FOR POSITIONING A MOVABLE PART OF A MACHINE TOOL RELATIVE TO A FIXED PART

[75] Inventors: Gerd Meiser; Heinz Dillhöfer, both of Witten-Annen, Fed. Rep. of Germany

[73] Assignee: Thyssen Industrie AG, Fed. Rep. of Germany

[21] Appl. No.: 938,331

[22] Filed: Aug. 31, 1978

[30] Foreign Application Priority Data

Sep. 21, 1977 [DE] Fed. Rep. of Germany ....... 2742404

[51] Int. Cl.$^2$ .................... B23B 47/06; B23Q 3/18
[52] U.S. Cl. ............................. 409/231; 29/26 A; 29/568; 318/657
[58] Field of Search ............... 29/26 A, 568; 90/11 A; 318/657, 653; 82/28 B; 409/231

[56] References Cited
U.S. PATENT DOCUMENTS 2,415,819  2/1947  Halpert et al. ................. 318/653
3,824,891  7/1974  Carroll ........................ 90/11 A Primary Examiner—Z. R. Bilinsky
Attorney, Agent, or Firm—McGlew and Tuttle

[57] ABSTRACT

A positioning device for positioning a part, such as, a movable part of a machine tool, relative to a fixed part of the machine tool, comprises, a transmitter adapted to be secured to one of said fixed and movable parts and having spaced apart first and second transmitter surfaces and a differential transmitter adapted to be secured to the other of the first and second parts and having first and second heads adapted to be positioned in alignment with the respective first and second transmitter surfaces, so that the heads produce a control signal in accordance with the amount of the heads aligned with the surfaces. Control means are connected to the respective heads and to means for moving a machine part to position the machine part in accordance with the coverages of the heads on the first and second surfaces.

5 Claims, 1 Drawing Figure

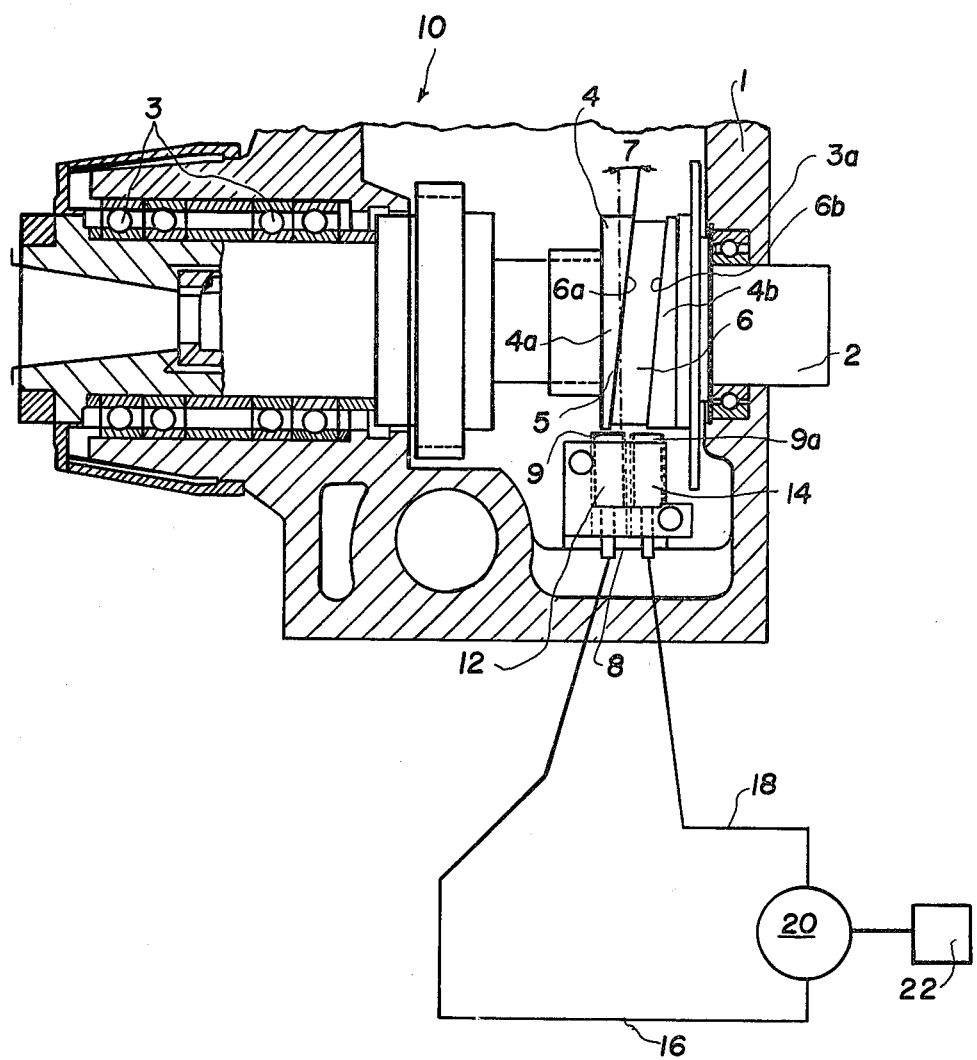

POSITIONING DEVICE FOR POSITIONING A MOVABLE PART OF A MACHINE TOOL RELATIVE TO A FIXED PART

FIELD AND BACKGROUND OF THE INVENTION

This invention relates to machine tools in general and, in particular, to a new and useful positioning device for positioning parts of machine tools.

DESCRIPTION OF THE PRIOR ART

Fixed stops, interrogation through limit switches or contactless switches are known for the positioning of machine parts, such as tables, work spindles, etc., as well as the positioning of mechanical detents. Additional pre-shutoff cams or similar switching elements serve the purpose of speed reduction for entering the position. The known positioning devices are costly in construction and are subject to mechanical wear. Another important disadvantage of the prior art is that they are time-consuming in operation, as in part, positioning takes place in several successive steps. Positioning devices are also known which are capable of long operation without mechanical wear by means of numerical odometry systems, such as, in connection with a numerical control. These solutions are also very expensive since they require extensive electronics.

SUMMARY OF THE INVENTION

In order to avoid the above-mentioned disadvantages of the prior art, the present invention provides a positioning device which controls the position of a part and approaches the control position quickly while enabling exact positioning to keep the machine part in the preselected position.

According to the invention, the positioning device comprises a position transmitter and a differential transmitter with coils designed as interrogation heads, with the transmitters being movable relative to each other, with the position transmitter being of a hat-shape section whose lateral boundaries deviate from the mutual travel direction.

One essential advantage of the device, according to the invention, is that it operates without contact and, therefore, without wear. It is also advantageous in that it can be mounted either on a plane surface, such as a machine table, with translatory motion, or on the periphery of a cylindrical part, such as a tool spindle or shaft, with rotary motion.

Accordingly, it is an object of the invention to provide a positioning device for positioning a part, such as a movable part of a machine tool relative to a fixed part, which comprises, a fixed machine part with a movable part adapted to move relative to a selected position in respect to the fixed part, with a transmitter adapted to be secured to one of the fixed and movable parts, having first and second transmitter surfaces, and with a differential transmitter adapted to be secured to the other fixed and movable parts and having first and second heads adapted to be disposed in alignment with respective portions of the first and second transmitter surfaces so that the heads produce a control signal in accordance with the amount of the head which is aligned with the surfaces and including control means connected to the heads for positioning a movable part in respect to the fixed part.

A further object of the invention is to provide a positioning device for positioning a movable part of a machine tool relative to a fixed part which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a partial axial sectional view of a spindle of a machine tool which is mounted for rotatable movement relative to the machine housing, constructed in accordance with the invention.

DESCRIPTION OF THE PREFERRED EMBODIMENT

Referring to the drawing in particular, the invention embodied therein, comprises, a positioning device for positioning a movable part, such as a spindle 2 of a machine tool, generally designated 10, relative to the housing 1 of the machine tool, for example, to position the spindle in respect to a tool change position of the housing or another associated part of the machine tool.

In accordance with the invention, a transmitter 4 is secured to a movable part or spindle 2, and it includes spaced apart position surfaces 4a and 4b which are aligned opposite to heads 9 and 9a of a differential transmitter 8 carried on the fixed part or housing 1.

The shown spindle 2 of the machine 10, particularly also in machining centers, poses the problem of exact positioning when tools are changed automatically. The spindle 2 must be stopped in an exactly defined position in which a tool (not shown) can be removed and the new tool inserted.

Spindle 2 of drilling and milling machine 10 is rotatably mounted in axially spaced roller bearings 3 and 3a in a machine housing 1. A position transmitter 4 is formed by a cylindrical part 5 which is rigidly connected to the spindle 2. The cylindrical part 5 has a position transmitter on its periphery, designed in the present case as a groove 6, having side walls 6a and 6b which form an angle 7 with a perpendicular to the axis of rotation. The position transmitter may also be designed in the form of a strip.

A differential transmitter 8 is mounted to the machine housing 1 in the area of the position transmitter 4. The differential transmitter 8 has two spaced apart interrogation heads 9 and 9a, each having a longitudinal axis which faces the position transmitter 4 in the tool changing position of spindle 2. Surfaces 4a and 4b adjacent respective edges 6a and 6b of the groove 6 cover a respective interrogation head 9 and 9a to the same extent. In any other position, before or after this, the coverage is uneven.

The device, according to the invention, operates as follows:

The differential transmitter 8 comprises two transmitters 12 and 14 of a combination of inductive impedance and ohmic resistance. To both transmitters 12 and 14, and AC voltage of a given frequency is fed. The transmitters 12 and 14 are interconnected in a manner such that, by means of a succeeding electronic system, an analog output signal is available which varies in direction and amount in dependence on the coverage of the one associated surface 4a and 4b of the position transmitters. It is only at identical coverage of both heads 9 and 9a, on the respective surfaces 4a and 4b, that an unequivocally defined signal is available which characterizes the position (tool changing position). The position transmitter is designed so that equal coverage of both transmitters is assured only in one narrowly defined position of the machine part.

A signal emitted by the differential transmitter 8 of the positioning device is fed via line 16 and 18 to the control device 20 of a positioning element 22 which guides the machine part spindle into a selected position, such as a tool changing position, and also returns it into the tool changing position in the event of deviations from this position.

While a specific embodiment of the invention has been shown and described in detail to illustrate the application of the principles of the invention, it will be understood that the invention may be embodied otherwise without departing from such principles.

What is claimed is:

1. A positioning device for positioning a part, such as a movable part of a machine tool, relative to a fixed part, such as a machine tool housing, comprising, a housing, a spindle rotatably mounted in said housing adapted to move relative to a selected position in respect to said housing, a position transmitter adapted to be secured to one of said housing and said spindle, said position transmitter including a cylindrical member having first and second transmitter surfaces, said first and second transmitter surfaces being axially spaced part, a differential transmitter adapted to be secured to the other of said fixed and movable parts and having first and second heads adapted to be disposed in alignment with respective portions of said first and second transmitter surfaces, said differential transmitter being mounted in said housing alongside said spindle, said heads producing a control signal responsive in accordance with the amount of said heads aligned with said respective portions of said first and second transmitter surfaces, control means connected to said first and second heads for positioning said movable part in respect to said fixed part, and said positioning transmitter including an annular groove separating said surfaces having axially spaced apart boundary walls defining said groove which form an angle perpendicular to the axis of rotation of said spindle.

2. A positioning device, as claimed in claim 1, wherein said differential transmitter is mounted on said fixed part and said position transmitter is mounted on said movable machine part.

3. A positioning device, as claimed in claim 1, wherein said groove boundary surfaces form two curves substantially parallel to each other having an increased deviation in the rotatable direction of said spindle.

4. A positioning device, as claimed in claim 1, wherein said position transmitter comprises a member having spaced apart boundary surfaces.

5. A positioning device, as claimed in claim 1, wherein the spacing between said surfaces equals the spacing between the centers of said heads.

* * * * *